United States Patent
Lagneaux et al.

(10) Patent No.: US 6,861,491 B2
(45) Date of Patent: Mar. 1, 2005

(54) METHOD FOR PRODUCING A THERMOSETTING POLYURETHANE FROM A THERMOPLASTIC POLYURETHANE AND THERMOSET POLYURETHANE OBTAINABLE USING SAID METHOD

(75) Inventors: Didier Lagneaux, Chozeau (FR); Stephane Dassin, Meyzieu (FR); Michel Dumon, Villeurbanne (FR); Francoise Mechin, Lyons (FR); Jean-Pierre Pascault, Villeurbanne (FR)

(73) Assignee: Noveon IP Holdings Corp., Cleveland, OH (US)

( * ) Notice: Subject to any disclaimer, the term of this patent is extended or adjusted under 35 U.S.C. 154(b) by 51 days.

(21) Appl. No.: 10/013,962

(22) Filed: Dec. 10, 2001

(65) Prior Publication Data

US 2002/0169255 A1 Nov. 14, 2002

(Under 37 CFR 1.47)

Related U.S. Application Data

(63) Continuation of application No. PCT/FR00/01534, filed on Jun. 5, 2000.

(30) Foreign Application Priority Data

Jun. 8, 1999 (FR) ............................................. 99 07454

(51) Int. Cl.$^7$ ............................................. C08G 77/26
(52) U.S. Cl. ........................................... 528/28; 528/38
(58) Field of Search ..................................... 528/28, 38

(56) References Cited

U.S. PATENT DOCUMENTS

| | | | | |
|---|---|---|---|---|
| 3,627,722 A | * | 12/1971 | Seiter | |
| 3,632,557 A | * | 1/1972 | Brode | 528/28 |
| 3,979,344 A | * | 9/1976 | Bryant et al. | 528/22 |
| 4,474,933 A | * | 10/1984 | Huber et al. | 528/26 |
| 4,625,012 A | * | 11/1986 | Rizk et al. | 528/28 |
| 5,700,868 A | * | 12/1997 | Hanada | 524/26 |

* cited by examiner

*Primary Examiner*—Margaret G. Moore
(74) *Attorney, Agent, or Firm*—Heslin Rothenberg Farley & Mesiti P.C.; Joe A. Powell; Thoburn T. Dunlap

(57) ABSTRACT

A method for producing thermosetting polyurethane

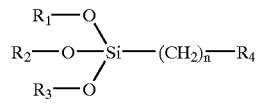

after transformation from thermoplastic polyurethane with a hydrolyzable organo-silane which is grafted onto macromolecules of said thermoplastic polyurethane by means of a bonding agent. Said organo-silane has general formula (I), wherein $R_1, R_2, R_3$=aliphatic alkyl, aromatic alkyl; n>1; R4 is an organic radical which can react with said bonding agent which comprises at least two isocyanate functions and the thermoplastic polyurethane obtained can, after transformation, become automatically cross-linked by coming into contact with water molecules in order to become thermosetting. The invention also relates to a product which can be obtained according to the inventive method.

15 Claims, 2 Drawing Sheets

METHOD FOR PRODUCING A THERMOSETTING POLYURETHANE FROM A THERMOPLASTIC POLYURETHANE AND THERMOSET POLYURETHANE OBTAINABLE USING SAID METHOD

CROSS REFERENCE TO RELATED APPLICATIONS

This application is a continuation of copending International Application PCT/FR00/01534, filed on Jun. 5, 2000, designating the United States and claiming priority from French application 99.07454, filed Jun. 8, 1999. The priorities of both applications are claimed herein, and the entire disclosures of both are incorporated herein by reference.

The invention relates to a method for producing a polyurethane that can be thermoset after processing, from a thermoplastic polyurethane. It also relates to the polyurethane thermoset after processing that can be obtained using said method.

Various thermoplastic materials are used to produce certain products, such as tubes for carrying hot fluids, electric cables, disc wheels, seals, silentblocs, shoe soles, etc.

Thermoplastic materials are used in these different applications, particularly because they are easy to implement and have high performance qualities at ambient temperature, are flexible and have a high degree of mechanical resistance. Nevertheless, these materials have the drawback of low physical resistance to heat such that the products obtained from said materials have, depending on their use, a short service life.

On the other hand, materials known as "thermosetting" materials are difficult to shape, even though they may be heat resistant, such that their use is limited.

Faced with these various problems, the aim was therefore to develop materials that combine the physical characteristics and ease of processing of thermoplastic materials with the thermomechanical characteristics of thermosetting materials, particularly heat resistance.

In order to achieve this, the preparation of a thermosetting polymer has been proposed by modifying easily processed thermoplastic polymers to enable the finished product to be cross-linked.

To achieve this aim a first method consists in mixing and extruding a polymer, particularly a polyethylene with a peroxide. However, this type of method not only has the drawback of being possible with a limited number of polyethylenes but also of requiring very expensive industrial installations.

Another method consists in irradiating a polymer with doses measuring 80 to 200 KGy. It should, however, be noted that this type of treatment is very expensive and also tends to deteriorate rather than improve the polymers used.

Another method, in particular that described in American U.S. Pat. No. 3,648,155 and US-A-4 117 195, consists in grafting a hydrolysable organosilane comprising at least one vinyl-type unsaturated chain in the presence of a grafting initiator of vinyl functions, particularly peroxide, and a condensation catalyst of the silane functions. The hydrolysis and condensation of the silane functions enable the polymer to cross-link to obtain the thermoset state.

However, all the above methods only give satisfactory results on polyethylene-based materials and their mixtures, copolymers or terpolymers as described for example in French patent FR-A-2 546 172.

The performances of polyethylene and its derivatives are not always satisfactory for the planned applications: reduced heat resistance, reduced resistance to abrasion, reduced flexibility, etc.

Thermoplastic urethane (TPU) type polymers, which have very satisfactory mechanical characteristics depending on the applications intended, are preferred to polyethylenes. All the standard known TPUs, however, lose their mechanical characteristics at around 70° C. Thermosetting polyurethanes can also be used even though they remain difficult to work.

The problem posed therefore consists in developing a manufacturing procedure for producing polyurethane that maintains the processing conditions of thermoplastic urethane polymers (TPUs) while preserving the main mechanical characteristics and adding improved heat resistance that is greater than that of cross-linked polyethylenes.

In order to achieve this aim the applicant proposes a method consisting in grafting a hydrolysable organosilane comprising at least one primary (—$NH_2$) or secondary (NH) amino chain directly onto a thermoplastic polyurethane. However, in the temperature processing method the reaction with the amine causes the main macromolecular chains to break. The silanes graft onto each end of the various fragments according to the reaction scheme below:

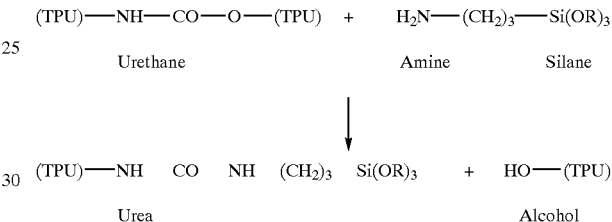

A grafted TPU is obtained that not only has a light molecular weight but also a low degree of thermomechanical resistance.

Faced with this drawback, the problem was therefore to propose a new method that enabled organosilanes to be grafted onto macromolecular chains of thermoplastic polyurethane that did not result in deteriorating said chains.

To achieve this the invention proposes a manufacturing method for a polyurethane that can be thermoset after processing using a thermoplastic polyurethane according to which a cross-linking agent is used to graft a hydrolysable organosilane onto thermoplastic polyurethane macromolecules, the hydrolysable organosilane having the general formula:

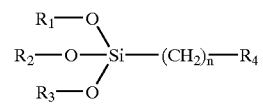

where $R_1$, $R_2$, $R_3$=aliphatic alkyl, aromatic akyl; $n \geq 1$;

$R_4$ being an organic radical capable of reacting with the said cross-linking agent which comprises at least two isocyanate functions, the thermoplastic polyurethane obtained being capable after processing of cross-linking on contact with water molecules to become thermoset.

In a preferred embodiment $R_4$ is selected from the group comprising the radicals $NH_2$, NH, SH, OH, phenol, epoxy. This list is not limitative and $R_4$ is understood to be any organic radical capable of reacting with an isocyanate function.

Advantageously the cross-linking agent is a diisocyanate with the general formula:

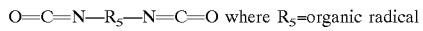

O=C=N—R$_5$—N=C=O where R$_5$=organic radical

The applicant has found to its surprise that selecting both molecules of the organosilane type with R$_4$=NH$_2$, NH, SH, OH, phenol, epoxy and molecules of the isocyanate type with functionality greater than or equal to 2 made it possible effectively to graft organosilanes to the macromolecular chains of thermoplastic polyurethane without damaging them.

The method of the invention has another advantage, viz. the ability to adapt to all types of TPU including esters, ethers, carbonates and caprolactones.

In addition, the selected TPU may be aliphatic or aromatic.

Finally, it may be in amorphous or semi-crystalline form.

In an advantageous embodiment of the invention the organosilane is aminopropyltrimethoxysilane, formula:

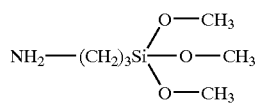

In this situation reactions between the urethane links of the TPU and isocyanate functions cause, either simultaneously or with a slight time-lag depending on the mixing procedure, the formation of aliophanates and isocyanate-amine reactions according to the reaction scheme below:

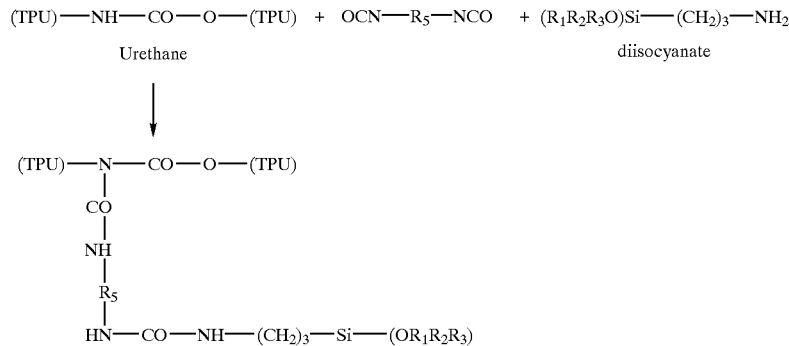

This series of reactions makes it possible to fix hydrolysable silane groups onto the TPU chain without damaging it. The fact of grafting several silanes onto the same TPU chain can also encourage subsequent cross-linking.

After processing, the thermoplastic polyurethane obtained cross-links to the humidity by hydrolysis and polycondensation of the silane functions grafted onto the various macro-molecular chains of the TPU in the classic silane hydrolysis and condensation reaction.

The diisocyanate used may advantageously be an aromatic, cycloaliphatic or aliphatic diisocyanate or their dimers.

The diisocyanate selected may advantageously be selected from among the following aromatic diisocyanates: TDI (1-3 diisocyanatomethylbenzene), 2,4'-MDI (1 isocyanato-2(4-isocyanatophenyl) methylbenzene), 4,4'MDI (1,1-methylene bis (4-isocyanatobenzene)), 2,4-TDI (2,4 diisocyanato-1-methylbenzene) or PPDI (1,4-diisocyanatobenzene) or their dimers.

The cycloaliphatic diisocyanate selected may advantageously be H$_{12}$ MDI (1,1-methylene bis (4-isocyanatocyclohexane)). Clearly the above list of diisocyanates that can be implemented in the method of the invention is not exhaustive. The following can also be used: HDI (1,6-diisocyanatohexane), CHDI (trans-1,4-diisocyanatocyclohexane), IPDI (5-isocyanato-1-(isocyanatomethyl)-1,3,3-trimethylcyclo-hexane), TMDI (1,6-diisocyanato-2,2,4 (or 2,4,4)-trimethylhexane), m-TMXDI (1,3-bis (1-isocyanato-1-methylethylbenzene), p-TMXDI (1,4-bis (1-isocyanato-1-methylethylbenzene), NDI (1,5-diisocyanatonaphthalene), polymer MDI (isocyanic acid, polymethylene polyphenylene ester), Desmodur R (1,1', 1"-methyllidynetris (4-isocyanotobenzene)), Desmodur RI (4-isocyanatophenol phosphorothioate (3:1) ester).

According to another aspect of the invention the concentration of cross-linking agent required to manufacture TPU is between 0.1 and 30% by weight of TPU and advantageously between 3 and 4% by weight.

For a concentration lower than 1% by weight of TPU, the quantity of cross-linking agent is insufficient to avoid cutting the primary chains of TPU. This results in loss of thermomechanical properties of the cross-linked polymer.

For a concentration higher than 30% the results obtained are no better such that the method becomes financially less attractive.

At the same time, the concentration of organosilane required to obtain polyurethane that can be thermoset after processing is between 0.05 and 15% of TPU by weight, and advantageously 2%.

For a concentration lower than 0.5% by weight, the mesh density is insufficient to obtain an insoluble product.

For a concentration higher than 15% by weight the price of the ingredients becomes financially less attractive.

In a first embodiment of the method of the invention:
- a mixture of thermoplastic polyurethane and cross-linking agent is reacted at temperatures between 120 and 220° C. to produce a reagent TPU;
- the reagent TPU mixture is then brought into contact with an organosilane;
- the resulting grafted TPU is then recovered.

The thermoplastic polyurethane obtained may subsequently be granulated or processed to produce sections of a given shape.

This type of reaction may be performed in one or two stages in a variety of reactors such as extruders, calenders, mixing tanks, etc.

When the method of the invention is implemented by extrusion a single- or twin-screw machine is used the profile of which can be easily adapted to each processed TPU. In this situation the extruder comprises at least two mixing zones and at least three heating zones.

The maximum temperature applied during the extrusion process is between 120 and 220° C. depending on the type of TPU. This is introduced together with the molecule comprising at least one isocyanate function; the hydrolysable organosilane is then introduced into a zone located between 0 and 0.5 times the total length of the screw.

As explained above, the mixture to be extruded is granulated on removal from the extruder or immmediately processed to obtain sections of a given shape. In the granular form the method has the advantage of providing half-finished products for use in other processes such as extrusion, calendering, injection, etc.

As explained above, half-finished TPU products that can be thermoset after processing may also be obtained by calendering or using a Brabender or similar type internal mixer or any other processing machine that shears the material at between 120 and 220° C.

In a second embodiment of the method of the invention:
the following are prepared separately:
    a first mixture of thermoplastic polyurethane and cross-linking agent at a temperature of between 20 and 60° C., and advantageously 40° C.;
    a second mixture of thermoplastic polyurethane and organosilane at a temperature of between 20 and 60° C.;
the two mixtures are caused to react with one another;
the resulting grafted TPU is then recovered.

As before, the thermoplastic polyurethane obtained is then either granulated or immediately processed.

The invention clearly relates to polyurethane that can be thermoset after processing and obtained by the method described above.

The invention and its advantages will be understood better from the following embodiments.

EXAMPLE 1

A mixture of TPU marketed by Goodrich under the trade-name Estane 58201 together with 4 pcr of diTDI (toluene diisocyanate dimer), i.e. 4% diTDI by weight is introduced into the foot of the hopper of a twin-screw extruder. One-third of the way down the total length of the screw 2.2 pcr of methylaminopropyl methoxysilane is introduced at temperatures of between 170 and 180° C.

The resulting product is stored in ambient air for two weeks.

The material is introduced into a TPU solvent; it is found that more than 85% of the material is insoluble, proving that cross-linking has indeed occurred and that the grafting has been effective.

Figure 1:
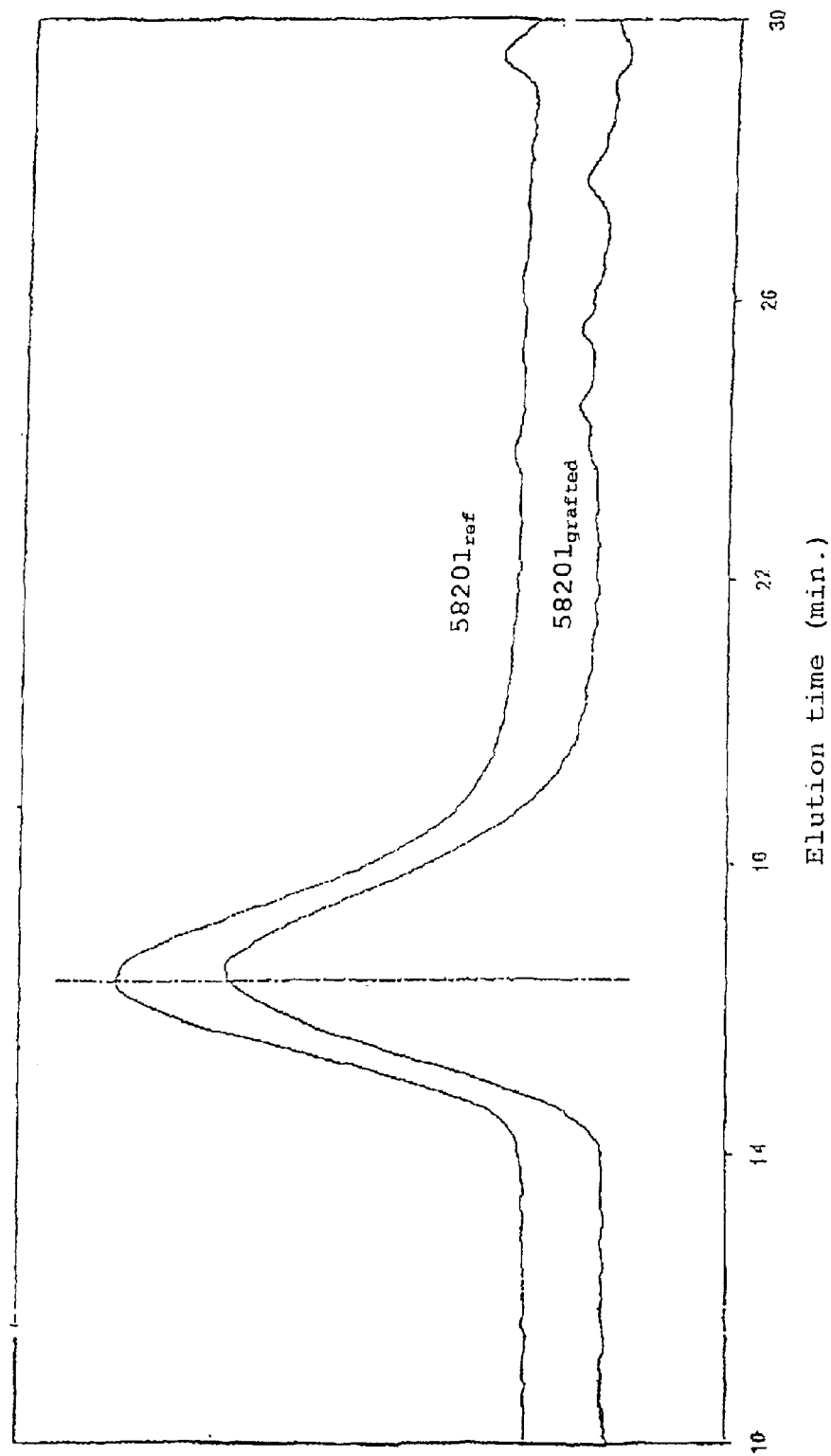
FIG. 1 is a chromatographic analysis of the grafted TPU of example 1.
Figure 2:
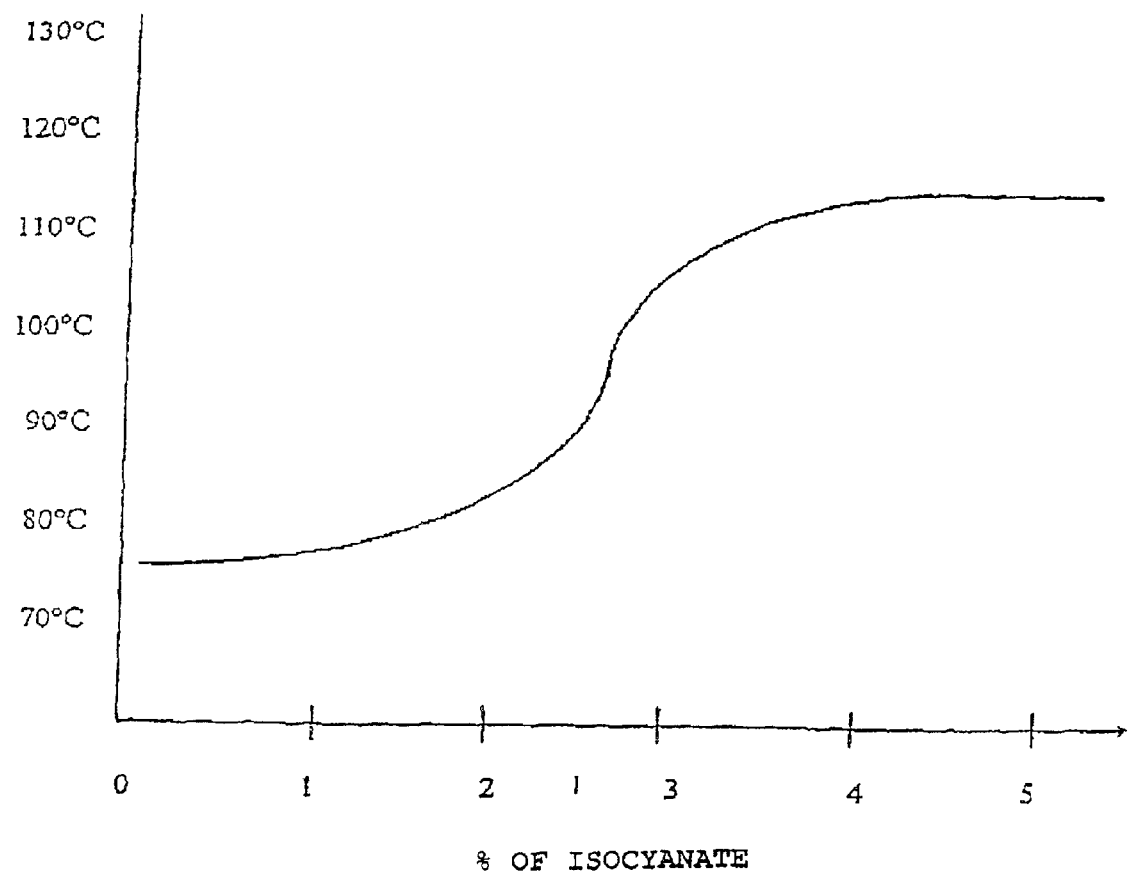
FIG. 2 shows changes in the Vicat point after cross-linking as a function of the percentages of cross-linking agent and organosilane.

Moreover, the chromatographic analysis of FIG. 1 shows that there is no notable difference in molecular weight between standard TPU and grafted TPU, thereby proving that the TPU chains have not been damaged.

EXAMPLE 2

In a single-screw extruder diameter 40 mm, length L/D 22, 3 pcr of MDI is introduced into the TPU marketed by Goodrich under the trade-name Estane 58277 at 170° C. Granules are obtained.

The resulting granules are reintroduced into the same extruder together with 2 pcr of γ-APS (methoxysilane) at a temperature of 170° C. (these two operations can be performed in a single stage if the extruder is fitted with an incorporation system after the hopper).

EXAMPLE 3

TPU marketed by Goodrich under the trade-name Estane 58201 is introduced into a mixer at a temperature of 170° C. After 30 seconds 2.5 pcr of γ-APS (ethoxysilane) is introduced and 30 seconds after that 4 pcr of TDI is added. The molten mass is then cooled.

EXAMPLE 4

As per Example 3 except that a calender heated to 120° C. is used instead of the mixer. TPU marketed by Goodrich under the trade-name Estane 5715 is melted, then after 20 seconds 4 pcr of diTDI is introduced and 30 seconds after that 2.2 pcr of M-APS (methoxysilane). The molten mass is then cooled.

In examples 2, 3 and 4 after a few days' exposure to humidity it will be seen that more than 80% by weight of the materials is insoluble and the initial Vicat point of each material is increased by 40° C.

FIG. 1 showing the changes in the Vicat point as a function of the percentage of isocyanate (molar ratio [organosilane/diisocyanate]=1) shows that for concentrations of diisocyanate greater than 4% the Vicat point of the original material is increased by 40° C.

The method makes it possible to retain the mechanical characteristics of the original polymer at temperatures higher than 40° C.

The invention and its advantages are demonstrated by the description.

Of particular note is the simplicity of the method as it requires no further stages after processing of thermoplastic polyurethane to obtain the cross-linking of the finished product.

What is claimed is:

1. Method for producing a polyurethane that can be thermoset after processing, said method comprising
    mixing a thermoplastic polyurethane and a cross-linking agent comprising at least two isocyanate functions and
    adding to the mixture a hydrolysable organosilane-having the general formula;

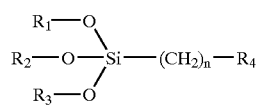

where $R^1$, $R_2$, $R_3$=aliphatic alkyl, aromatic alkyl;
    $n \geq 1$; and
    $R_4$ is an organic radical capable of reacting with the cross-linking agent;
    whereby the hydrolysable silane is grafted onto the macromolecules of the thermoplastic urethane via an allophanate linkage.

2. Method as claimed in claim 1, wherein $R_4$ is selected from the group consisting of primary amino, secondary amino, thio, hydroxy, phenoxy and epoxy.

3. Method as claimed in claim 1, characterized in that the cross-linking agent is a diisocyanate with the general formula:

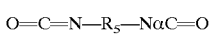

where $R_5$=organic radical.

4. Method as claimed in claim 1, characterized in that the organosilane is aminopropyltrimethoxysilane.

5. Method as claimed in claim 1, characterized in that the diisocyanate is selected from the group comprising of aromatic, cycloaliphatic and aliphalic diisocyanates and their dimers.

6. Method as claimed in claim 5, characterized in that the aromatic diisocyanate is selected from the group consisting of TDI (1,3-diisocyanatomethyl-benzene), 2,4'-MDI (1-isocyanato-2-(4-isocyanatophenyl) methylbenzene), 4,4'MDI (1,1-methylene bis (4-isocyanatobenzene)), 2,4-TDI (2,4diisocyanato-1-methylbenzene) and PPDI (1,4-diisocyanatobenzene) or their dimers.

7. Method as claimed in claim 5, characterized in that the cycloaliphatic diisocyanate is $H_{12}$MDI (1,1-methylene bis (4-isocyanalocyclohexane)).

8. Method as claimed in claim 1, characterized in that the concentration or cross-linking agent is between 0.1 and 30% by weight or thermoplastic polyurethane.

9. Method as claimed in claim 1, characterized in that the concentration or organosilane is between 0.05 and 15% by weight or thermoplastic polyurethane.

10. Method as claimed in claim 1, the mixture of thermoplastic polyurethane and cross-linking agent is reacted at temperatures between 120 and 220° C. to produce a reagent TPU;

the reagent TPU mixture is then brought into contact with the organosilane; and the resulting grafted TPU is then recovered.

11. Method as claimed in claim 10, characterized in that the grafted thermoplastic polyurethane obtained is subsequently granulated or immediately processed.

12. A polyurethane capable of being thermoset after processing obtained using the method of claim 10.

13. Polyurethane capable of being thermosot after processing obtained using the method described in claim 1.

14. A method as claimed in claim 1, wherein the concentration of cross-linking agent is 4% by weight of thermoplastic polyurethane.

15. A method as claimed in claim 1, wherein the concentration of organosilane is 2% by weight of thermoplastic polyurethane.

* * * * *

UNITED STATES PATENT AND TRADEMARK OFFICE
CERTIFICATE OF CORRECTION

PATENT NO. : 6,861,491 B2
DATED : March 1, 2005
INVENTOR(S) : Didier Lagneaux et al.

It is certified that error appears in the above-identified patent and that said Letters Patent is hereby corrected as shown below:

Column 6,
Line 51, delete "$R^1$" and insert -- $R_1$ --.
Line 65, delete "$O=C=N-R_5-N \propto C=O$" and insert -- $O=C=N-R_5-N=C=O$ --.

Column 7,
Line 16, delete "(4-isocyanalocyclohexane))." and insert -- (4-isocyanatocyclohexane)). --
Lines 18, 19, 21 and 22, delete "or" and insert -- of --.

Column 8,
Line 13, delete "thermosot" and insert -- thermoset --.

Signed and Sealed this

Twenty-fourth Day of May, 2005

JON W. DUDAS
*Director of the United States Patent and Trademark Office*